March 15, 1938.  Z. SOCHOR  2,111,010
APPARATUS FOR COOLING OR HEATING AND MIXING
Filed Jan. 29, 1937
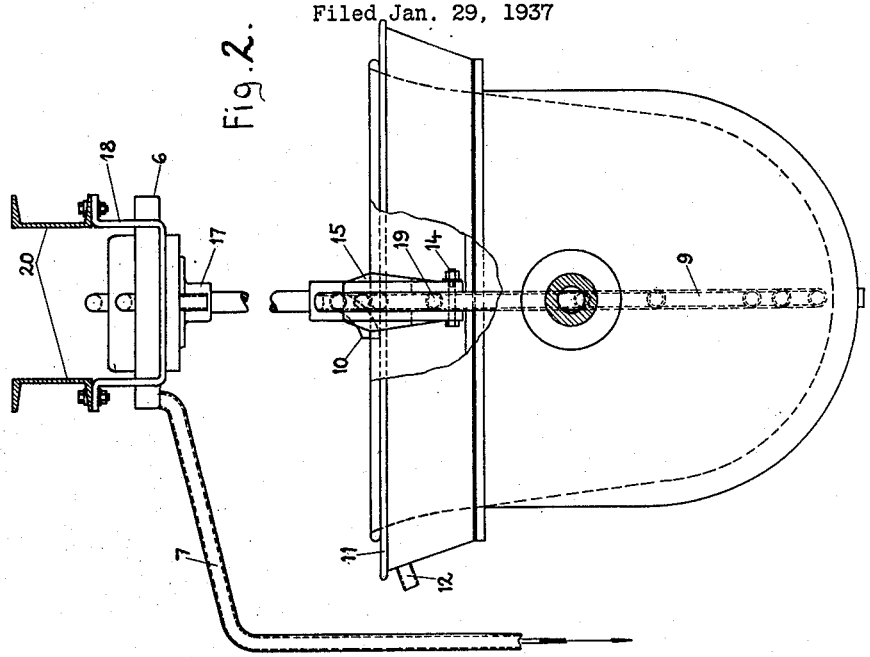
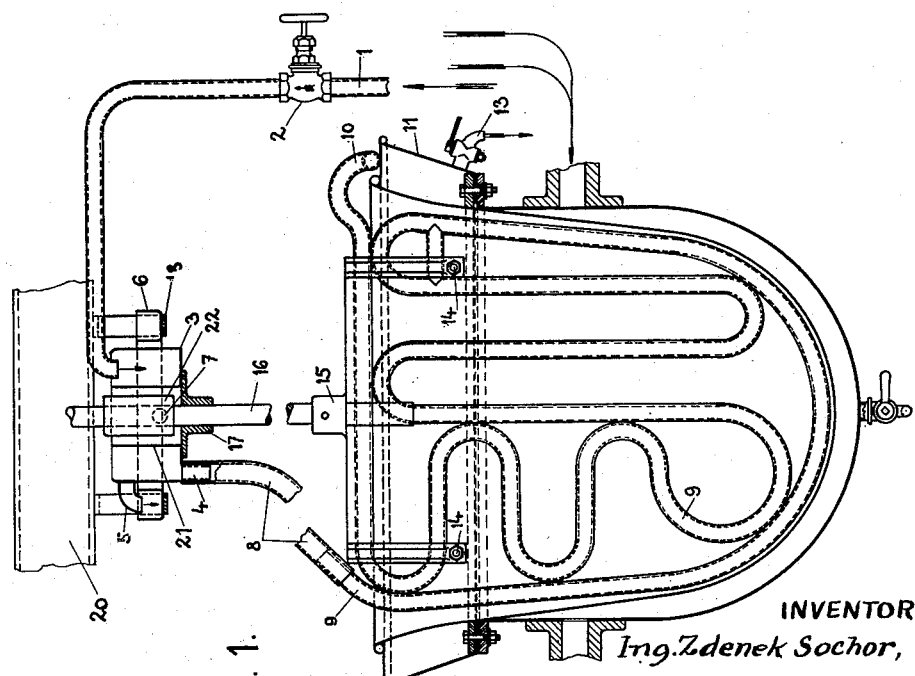
INVENTOR
Ing. Zdenek Sochor,
Christian R. Nielsen
ATTORNEY.

Patented Mar. 15, 1938

2,111,010

UNITED STATES PATENT OFFICE 2,111,010

APPARATUS FOR COOLING OR HEATING AND MIXING

Zdeněk Sochor, Dvůr Králové N. L., Czechoslovakia

Application January 29, 1937, Serial No. 123,080 In Czechoslovakia October 25, 1935

1 Claim. (Cl. 257—107)

This invention has to do with apparatus for cooling or heating and mixing.

In the preparation of colour mixings, materials, or viscous bodies used in calico printing or other textile processes, it is necessary to first heat and then cool the mixings which are more or less of a stiff consistency and a constant stirring is requisite.

It is usual to effect the heating and the cooling by allowing steam or cold water to circulate through the cavity of a jacketed pan or vessel. The mixing is effected by a revolving agitator with upright gear driven shaft, or by some other known mixer or stirrer device.

The output in a given period of time, depends to a great extent on the time necessary for heating up the contents of the pan or vessel at the commencement and for the cooling down at the end of the process.

As the mixes are frequently of a thick or viscous nature particularly on cooling, the time requisite to effect a thorough cooling in large pans or vessels may be as much as 8 hours. As the cooling proceeds from the outside walls it is not possible to prevent undue cooling of the mass adjacent to the outside wall, and this has a tendency to produce a substantial crust on the inner face of the wall. This crust is not easily removed and in any case represents a loss of the product.

The improvements apply to pans or vessels with or without a jacket.

According to the invention the main cooling and/or heating is effected in mixing apparatus of the type indicated by means of a hollow rotatable or agitatable mixer, or coil or like contrivance forming or combined with the agitator and through which fluids, water, gases, may be caused to circulate.

The cooling and/or heating is carried out with the new fluid circulating contrivance submerged in the mix in the pan or vessel. The usual cooling through the jacket can be used at the same time. It is found that the cooling of a starch or colour mixture is shortened to the extent of a third of the normal time, and as the cooling proceeds outwards from the mix, same takes place evenly and quickly and practically no crust is formed, which represents an economy.

One example of my improved apparatus for cooling, heating and mixing is illustrated in the accompanying drawing.

Figure 1 is a view showing a vertical section of the colour pan,

Fig. 2 is a side view of the colour pan showing some details in section.

The mixer shaft may have a vessel or trough 3 attached in concentric fashion and rotatable therewith, and same can have an overflow or drainage outlet 5, leading into annular overflow vessel 6, supported by elements 18. Entering the vessel or trough is the inlet pipe 1 for the cooling or other fluid, a control valve 2 being provided.

The vessel or trough has an outlet 4 and is connected as by a flexible pipe or hose 8 to the mixer contrivance which may be a properly shaped coil 9, fastened by bolts 14 to a cross head 15 with shaft 16, the latter being detachably fixed to the mixer shaft which may be part of or connected with the vertical driving shaft. Provision is preferably made for readily detaching and reconnecting the mixing contrivance which may require to be taken out before tilting the pan or vessel for pouring the contents. The coil 9 comprises combined serpentine and U-shaped sections by means of which thorough cooling or heating of the batch may be effected, by reason of the various dispositions of the coil portions.

It is possible to combine with an existing mixing pan or vessel a coil of pipe connected up to the vertical driving shaft and the flexible hose above the top of the pan or vessel, and the coil of pipe may be so shaped that during rotation its convolutions travel practically through the entire contents of the pan or vessel, care being taken that parts of the coil approach near to the inside wall to ensure even results. In both cases described there is an outlet 10 from the coil which may depend or dip over the rim of the pan or vessel and discharge into an attached or combined annular receiving or collecting compartment 11 with drainage valve outlet 13 and overflow or pipe connection 12.

Also, by proper provision, the cooling or other fluid discharged from the coil structure into the annular or other receiving or collecting compartment 11 can be utilized over again and as a cooling fluid for the interior of the water jacket of the pan or vessel.

The amount of fluid effecting cooling at any particular moment will depend on the capacity of the coil and a hydrostatic pressure determined by the height of revolving vessel 3 over outlet 10. Intensive cooling effect is obtained by reason that the coil containing the cooling fluid is entirely surrounded by the mass to be cooled.

It is possible to produce the rotary hollow mixing contrivance as a hollow machined casting or from built-up or welded parts; or a rotary mixing structure may have a pipe coil attached.

It is obvious that heating fluid may be circulated in similar manner, and the contrivance may be constructed for heating by steam, the inflow being regulated so that the steam condenses in the coil, and there may be only one pipe or connection leading to the coil and an outlet which discharges the condensate in suitable fashion.

If a more intensive heating is desired proper steam circulation would be provided to and from the mixing apparatus. In such case connections and stuffing boxes or fluid tight joints would be necessary. Provision may be made to permit ready emptying of the contents without having to remove the mixer contrivance as for example the mixer may be arranged to be lifted and lowered.

Various kinds of actual mixer mechanism are used in mixing plants for pans or vessels, as for example duplex or planetary mixing combinations, and my improvements can be used on the cooling and/or heating part of such mixer mechanism.

The improvements may be used in connection with jacketed or other heating pans or vessels which deal with food-stuffs, solutions, etc.

It will be understood that the contents of a pan or vessel with the present improvements combined can be heated in the usual fashion by introducing heating fluid into the jacket of the pan or vessel in ordinary or known fashion.

I claim:

In a device of the class described, a vessel, a jacket for the vessel having inlet and outlet ports, a trough circumscribing the vessel, a driven shaft disposed axially of the vessel, a cross head fixed to the shaft, said shaft projecting upwardly above the vessel, a trough fixed to the shaft above the vessel and rotatable therewith, a stationary overflow vessel, overflow means between the last named vessel and the fixed trough, an outlet connection in the last named trough, a coil fixed to the cross head, said coil comprising portions substantially the contour of the inner wall of the jacketed vessel and lying closely spaced thereto, one terminal of the coil having connection with the outlet connection of the trough upon the shaft, and the other terminal of the coil discharging into the trough circumscribing the jacketed vessel.

ZDENĚK SOCHOR.